(12) United States Patent
De Benedittis et al.

(10) Patent No.: US 8,459,321 B2
(45) Date of Patent: Jun. 11, 2013

(54) TREAD FOR TIRE INCLUDING GUM BLOCKS WITH NOTCHES

(75) Inventors: Eric De Benedittis, Greenville, SC (US); Sylvie Lhospitalier, Ennezat (FR); Eric Slachmuylders, Clermont-Ferrand (FR); Pierre Yem, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 396 days.

(21) Appl. No.: 12/680,440

(22) PCT Filed: Sep. 29, 2008

(86) PCT No.: PCT/EP2008/063030
§ 371 (c)(1),
(2), (4) Date: Jun. 8, 2010

(87) PCT Pub. No.: WO2009/040441
PCT Pub. Date: Apr. 2, 2009

(65) Prior Publication Data
US 2010/0307650 A1 Dec. 9, 2010

(30) Foreign Application Priority Data
Sep. 27, 2007 (FR) ...................... 07 06858

(51) Int. Cl.
*B60C 11/12* (2006.01)
*B60C 11/117* (2006.01)
(52) U.S. Cl.
USPC ................. 152/209.18; 152/209.17

(58) Field of Classification Search
USPC ............. 152/209.18, 209.15, 209.21, 209.17, 152/902, 154.2, DIG. 3
See application file for complete search history.

(56) References Cited

U.S. PATENT DOCUMENTS

| 2,100,084 | A | 11/1937 | McNeill | |
| 2,339,558 | A | 1/1944 | Hale | |
| 2006/0213594 | A1* | 9/2006 | Kemp et al. | ................ 152/154.2 |

FOREIGN PATENT DOCUMENTS

EP         0 255 815 A    2/1988

(Continued)

OTHER PUBLICATIONS

International Search Report (PCT/ISA/210) for PCT/EP2008/063030 dated Nov. 27, 2008.

*Primary Examiner* — Eric Hug
(74) *Attorney, Agent, or Firm* — Buchanan Ingersoll & Rooney PC

(57) ABSTRACT

Tread for a tire provided with a running surface intended to come into contact with the roadway when running, this tread comprising a plurality of blocks of mean axis XX' intersecting the running surface of the tread, each block, including a side wall that makes a full circuit of the block about the axis XX'. This side wall intersects the running surface at an edge with a closed geometric outline, this edge delimiting a contact surface via which the block makes contact with the roadway. The side wall of the block and the opposite wall delimit an incision, the blocks being provided on their lateral surface with at least one notch having a depth measured perpendicular to the lateral surface of the block and a width measured parallel to the lateral face of the block, the at least one notch at least partially making a circuit of the block about the axis XX', that is to say at least over 180 degrees.

7 Claims, 2 Drawing Sheets

FOREIGN PATENT DOCUMENTS

| | | |
|---|---|---|
| EP | 0 664 230 B1 | 10/1997 |
| JP | 1-101205 A | 4/1989 |
| JP | 1-285409 A | 11/1989 |
| JP | 5-131812 A | 5/1993 |
| JP | 7-172111 A | 7/1995 |
| JP | 8-258515 A | 10/1996 |

* cited by examiner

TREAD FOR TIRE INCLUDING GUM BLOCKS WITH NOTCHES

The invention relates to treads for tires and in particular relates to a tread pattern for such treads comprising a new geometry of incision that improves the grip performance of the said treads on ground covered with water without in any way diminishing their durability in terms of wear.

The invention relates to treads intended for the manufacture of new tires or for retreading tires and, in particular, tread patterns for the said treads that comprise a great many cuts in the form of grooves and/or of incisions. What is meant in the present description by incision is a cut with a width of 2 mm or less, while a groove is a cut more than 2 mm wide.

It is known practice, for example from U.S. Pat. Nos. 2,100,084, 2,339,558, EP 0664230 B 1, to make incisions of which the outline on the running surface of the tread is of closed circular shape making it possible to have active edges in all directions tangential to the running surface. Each of these incisions delimits and isolates a rubber block (of which the cross section has dimensions that are relatively small in comparison with the width of the tread) connected to the tread only by its base, that is to say by that part of the block that is furthest from the running surface. This rubber block is compressed upon contact with the ground and is also subjected to forces acting tangentially to the contact surface via which it makes contact with the ground during running, the latter forces having a tendency to deform it both in terms of shear and in bending.

These deformations of the block result in hysteresis losses which lead to increased rolling resistance and uneven wear. What is meant here by uneven wear is wear that is not uniform across the entire running surface, that is to say wear which is locally more pronounced than it is across the tread as a whole.

One of the objectives of the invention is to propose a tread provided with a plurality of rubber blocks delimited by incisions and of which the rolling resistance is improved over treads of the state of the art, without in any way diminishing the endurance in terms of wear. What is meant by the endurance of a tread is the length of time for which the said tread can be used before the degree of wear reaches the wear indicators that indicate that the tread has to be removed and replaced or retreaded.

The objective is achieved by virtue of a tread for a tire having a thickness E and provided with a running surface intended to come into contact with the roadway during running, this tread comprising a plurality of rubber blocks of mean axis XX', this mean axis XX' intersecting the running surface of the tread. Each rubber block has a height H at most equal to the thickness E of the tread and comprises a side wall that makes a full circuit of the said block about the axis XX', this side wall intersecting the running surface at an edge of which the outline on the running surface is closed, this edge delimiting a contact surface via which the block makes contact with the roadway. This block comprises a base situated a distance H from the contact surface via which the said block makes contact with the roadway.

The side wall of each block is connected at its base inside the tread to a wall opposite, the side wall of the block and the said wall opposite delimiting an incision of mean width e.

Furthermore, the rubber blocks are provided on their lateral surface with at least one notch having a depth S measured perpendicular to the lateral surface of the block and a width L measured parallel to the lateral face of the block and in the direction of the height of the block, the said at least one notch making an at least partial circuit of the axis XX' and being positioned between 20% and 80% of the height H of the block with respect to the running surface.

For preference, the total angle determined by the notch (if there is just one of these) or notches is equal to at least 180 degrees. In the case of at least two notches, it is the sum of the angles of each notch that has to be at least equal to 180 degrees.

For preference, this notch makes at least one full circuit around the axis XX', that is to say over at least 360 degrees.

The dimensions of the notches are such that their depth S and their width L are at least equal to the width e of the incision.

Each incision is defined by the space delimited chiefly between two main walls facing one another, the said walls being perpendicular to or oblique with respect to the running surface. Advantageously, for running surfaces intended for heavy goods vehicles, the width of an incision delimiting a rubber block is less than 2 mm (preferably ranging between 0.05 mm and 2 mm).

What is meant by the mean direction XX' of a rubber block delimited by an incision is the direction connecting the geometric centre of gravity of the base of the block, that is to say the part of the block furthest towards the inside of the tread, to the geometric centre of gravity of the contact surface via which the block makes contact with the roadway (this direction makes an angle of 90° with the said surface when the generatrix of the rubber block is perpendicular to this surface).

A tread pattern, comprising incisions delimiting rubber blocks according to the invention, has the advantage of having a long length of active edges in contact with the ground and that this is true for various levels of wear of the said tread.

A tread pattern according to the invention also allows savings to be made in terms of rolling resistance, that is to say makes it possible to limit hysteresis losses associated with cyclic deformations of the materials of the tread by localizing the deformations experienced by the rubber blocks to those parts situated between the notches and the contact surface of the blocks. Thus, for the same size of tire, it is possible to increase the lengths of the edges in order to improve grip while at the same time limiting tread deformation.

The notch made in each block behaves like a kind of pivot point for the block, allowing the part of the block that is radially on the outside of the notch to be decoupled from the part radially on the inside. In this way, the movements of rubber transmitted to the base of the block are effectively limited.

For preference, at least one notch is positioned between 20% and 80% of the height H of the block or, more preferably still, between 70% and 80% of the height H (in the latter case, the notch is formed closer to the base of the block than to the running surface).

Advantageously, the area of the contact surface of the block as new is less than the area of the base of the block. More advantageously still, the area of the contact surface of the block increases continuously from the surface in the as-new state to the base of the block.

In order to limit the movements of that part of the block that is situated between the notch and the base, it is sensible to provide at least one additional connection with the rest of the tread, this additional connection being afforded by a bridge of rubber connecting the side wall of the block with the wall opposite, this rubber bridge being located near the base of the block and limited in height below the notch closest to the base of the block.

In the latter instance it is advantageous to anticipate having four bridges of rubber distributed uniformly about the block.

To allow the invention and its advantages to be better understood, a number of alternative forms of embodiment of the invention are now described by means of the following figures:

FIG. 1B depicts the running surface of the tread shown in FIG. 1a;

In order to make the figures and the description easy to comprehend, one and the same reference is used in the figures when it is one and the same functional and/or structural element that is being designated.

Figure 1A:
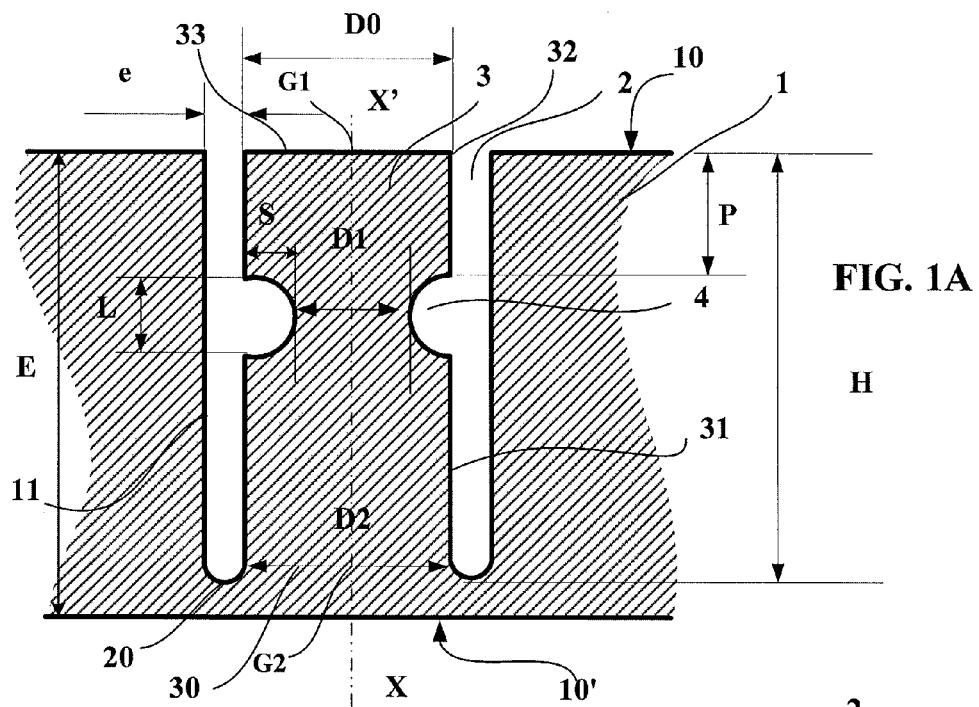
FIG. 1A shows, in cross section, part of a tread comprising a plurality of blocks according to a first alternative form of embodiment of the invention.

FIG. 1A shows, in cross section, part of a tread 1 for a tire, the said tread 1 having a thickness E measured in the as-new state, as being the distance separating the running surface 10 intended to come into contact with the roadway during running and an interior surface 10' intended to be pressed onto the radially outermost surface of a green tire.

The tread 1 according to the invention is provided with a tread pattern formed by grooves and incisions not shown here. At least some of these incisions are incisions 2 of cylindrical shape with a depth H less than the thickness E of the tread 1 and which delimit and isolate rubber blocks 3 of height H from the remainder of the tread. Each rubber block 3 comprises a base 30 (the part furthest towards the inside of the tread) connecting the said block 3 to the tread 1 and has a mean axis XX' intersecting the running surface 10 of the tread. This means axis XX' is an imaginary straight line passing through the geometric centers of gravity G1, G2 of the contact surface 33 of the block 3 and of the base 30 of the said block.

Each rubber block 3 comprises a side wall 31 that makes a circuit of the said block about the mean axis XX'; this side wall 31 intersects the running surface along an edge 32 of which the geometric outline on the running surface is closed, this edge 32 delimiting a contact surface via which the block 33 makes contact with the roadway. The side wall 31 of each block 3 is connected, at the base of the block 30, to a wall 11 opposite by a connecting part 20. The side wall 31 of the block 3 and the wall 11 opposite delimit an incision 2 of mean width e equal to 0.5 mm. The block 3 has a geometry of a cross section which, in this particular instance, is circular; of course any block cross section may be envisaged.

Furthermore, the rubber block 3 is provided on its lateral surface 31 with a notch 4 having a depth S measured perpendicular to the lateral surface 31 of the block equal in this instance to 0.5 mm and a width L measured parallel to the lateral face 31 of the block and in the direction of the height of the block, equal, in this instance, to 1.0 mm. When viewed in the plane of FIG. 1A, this notch is of semicircular cross section (the depth S if equal to half the width L) and makes a full circuit of the block 3 about the axis XX'. In the case of this first alternative form of embodiment, the notch 4 is situated a distance P from the running surface 10, this distance being constant at all points around the block. For preference, this distance ranges between 20% and 80% of the depth H of the incision 2 delimiting the rubber block 3. The distance P is measured between the running surface 10 of the as-new tread and the nearest edge formed by the notch 4 on the lateral surface 31 of the block.

Figure 1B:
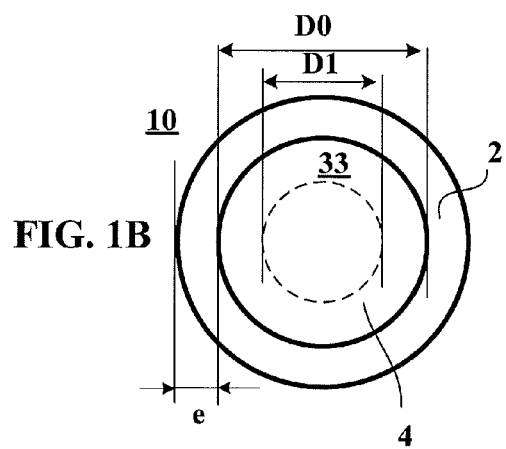

FIG. 1B shows a view of the running surface of the rubber block 3 of FIG. 1A. It is possible to discern the contact surface 33 of the block, which is circular in shape with a diameter D0 (in this instance equal to 8 mm) and the incision 2 of circular shape and of width e. The cross section of the block 3 is reduced at the notch 4 to a diameter D1 equal, in this instance, to 7 mm.

Figure 2:
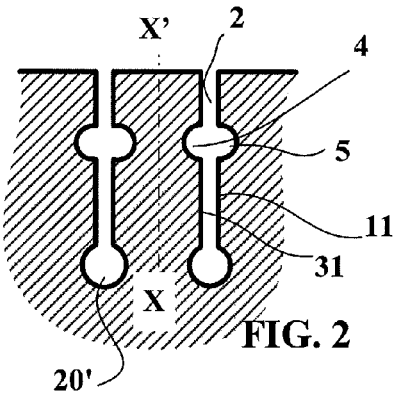
FIG. 2 shows a second alternative form of embodiment of block according to the invention.

FIG. 2 shows a second alternative form of embodiment of block 3 in which the incision 2 delimiting the said block ends radially on the inside in a widened part 20' of a width greater than the width e of the incision. Further, a second notch 5 is formed on the wall 11 of the tread opposite the notch 4 made in the lateral face 31 of the rubber block 3. Hence, it is permissible for the compression rigidity to be modified locally near the edge of the tread radially on the outside of this second notch 5 and thereby improve the wear performance. This second notch 5 is, in this alternative form of embodiment, formed at the same depth P as the notch formed on the rubber block, but could be formed at a different depth. Likewise, it might be possible to imagine a greater number of notches 5 on the wall 11 of the tread than on the side wall of the block.

In the preceding alternative forms of embodiment, the geometric outlines, on the running surface 10 of the as-new tire, of the incisions 2 delimiting the rubber blocks 3 have had a circular shape: of course, everything described may be applied to the use of different shapes: oval, rectangular or the like.

Figure 3:
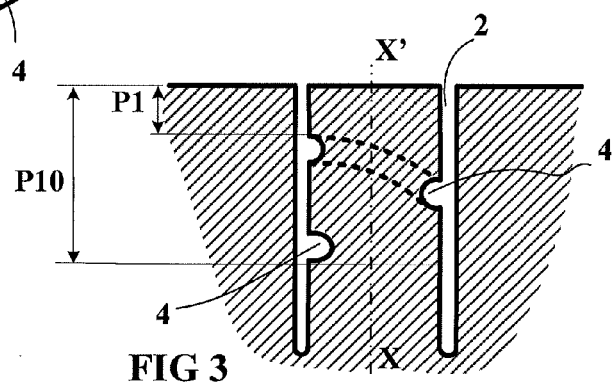
FIG. 3 shows a third alternative form of embodiment of block according to the invention, in which the notch follows a portion of a helix.

FIG. 3 shows a third alternative form of embodiment of block 3 in which the lateral face 31 of the cylindrically-shaped rubber block is provided with a notch 4 which makes a full circuit of the said block and follows a helical path about the mean axis XX'. According to this alternative form of embodiment, the notch appears gradually on the running surface as the tread wears down from a first step P1 ending at a maximum depth P10; these two depths preferably ranging between 20% and 80% of the depth of the incision 2 delimiting the block 3.

Figure 4:
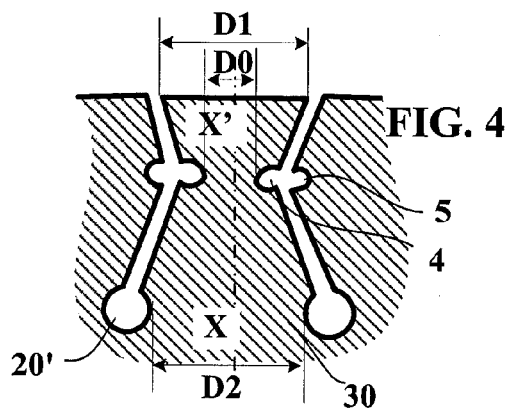
FIG. 4 shows a fourth alternative form of embodiment of block according to the invention.

FIG. 4 shows a fourth alternative form of embodiment of block 3 in which the area of the contact surface of the block decreases as the tread wears until it reaches the notch 4 and then increases down to the base 30 of the said block. In the example shown, the notch 4 makes a full circuit of the block and is situated at a depth P measured relative to the contact surface of the as-new block. At the as-new contact surface, the diameter is D1, then changing to D0 at the notch and finally adopting a value D2 at the base, these three diameters following the relationship D2>D1>D0 (D2 is greater than D1, the latter being greater than D0).

The reduction in the cross-sectional area of the block at the notch here represents 20% of the area of the as-new contact surface of the block and thereafter the area of the base of the block is increased by 20% in comparison with the same contact surface of the block in the as-new state.

This construction makes it possible to improve the performance of the tread in terms of drive by increasing the rigidity of the block from the moment the part under the notch reaches the running surface, while at the same time increasing the length of edge as the tread wears.

Figure 5:
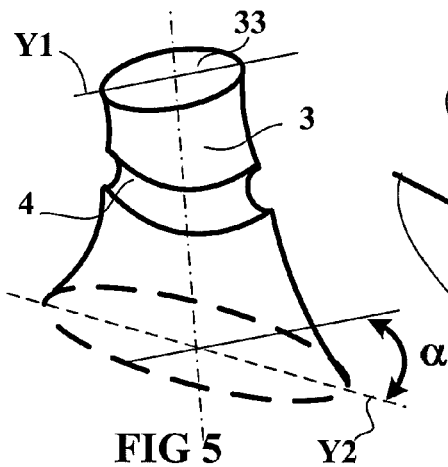
FIG. 5 shows a fifth alternative form of embodiment of block according to the invention.

In the fifth alternative form of embodiment of block 3 according to the invention and depicted in FIG. 5, a notch 4 completely surrounds the block of which the as-new contact surface 33 is an ellipse having a main major axis Y1 and of which the surface of the base 30 of the block 3 is also an ellipse having a main major axis Y2. In this alternative form of embodiment, the main axes Y1 and Y2 of the as-new contact surfaces and of the surface of the base of the block run in different directions and have an angular offset (α) preferably of at least 45 degrees.

Figure 6:
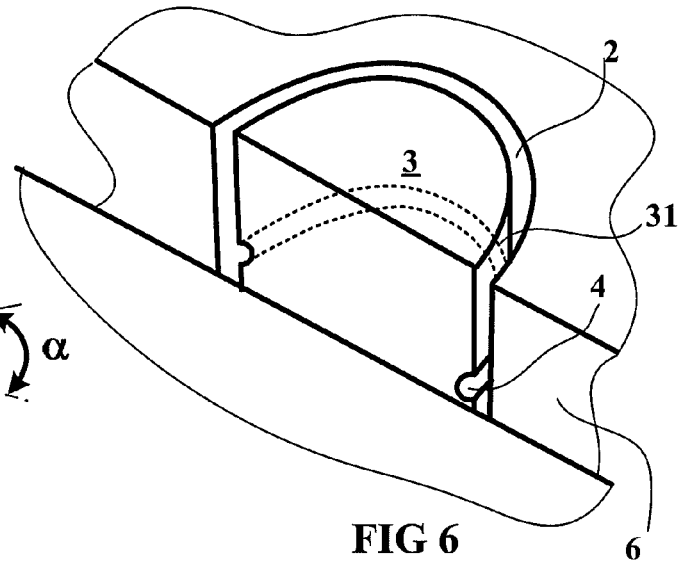
FIG. 6 shows a sixth alternative form of embodiment of block according to the invention.

FIG. 6 shows a sixth alternative form of embodiment of the invention in which a block 3 is delimited for the most part by an incision 2 and to a lesser extent by a groove 6. In this alternative form of embodiment, a notch 3 is formed on the side wall 31 of the block 3 delimiting the incision 2.

Figure 7:
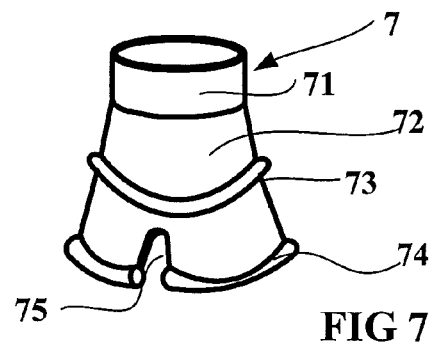
FIG. 7 shows a blade intended to be fitted into a mould in order to mould a seventh alternative form of embodiment of block according to the invention.

FIG. 7 depicts a molding element 7 intended to be fitted to a mould for molding a tread. This molding element 7 serves to mould a shape of incision according to the invention and thus to isolate a rubber block in the tread. In the scenario shown, this molding element 7 comprises a cylindrical first part 71 intended to be fixed to a tread mould and a second part 72 in the continuation of the first part, this second part 72 being formed of a blade having a thickness corresponding to the width of the incision molded with this molding element. In the scenario shown, the molded incision is substantially of frustoconical shape. Further, the molding element 7 comprises on its second part 72 and at its end 74 furthest from the first part 71, a kind of bulge of a width greater than the thickness of the blade that forms the second part 72. Substantially mid-way up the height of the second part 72 of the element 7 is formed a bead 73 which is formed in such a way as to project onto the interior and exterior surfaces of this element, this bead 73 being intended to mould a notch on the block delimited by the incision molded by this element and a notch on the wall opposite.

Further, a notch 75 is formed through the wall of the element 7 and extends between the end 74 of the blade intended to be furthest towards the inside of the tread; this notch 75 is intended to mould a bridge of rubber between the lateral face of the block molded by the element and the wall opposite. This local connection between the walls delimiting the incision amplifies the desired pivot phenomenon by immobilizing the block still further as close as possible to its base, that is to say between the said base and the notch closest to the said base. In this example, the notch in the block closest to the base of the block is molded by the bead 73.

Figure 8:
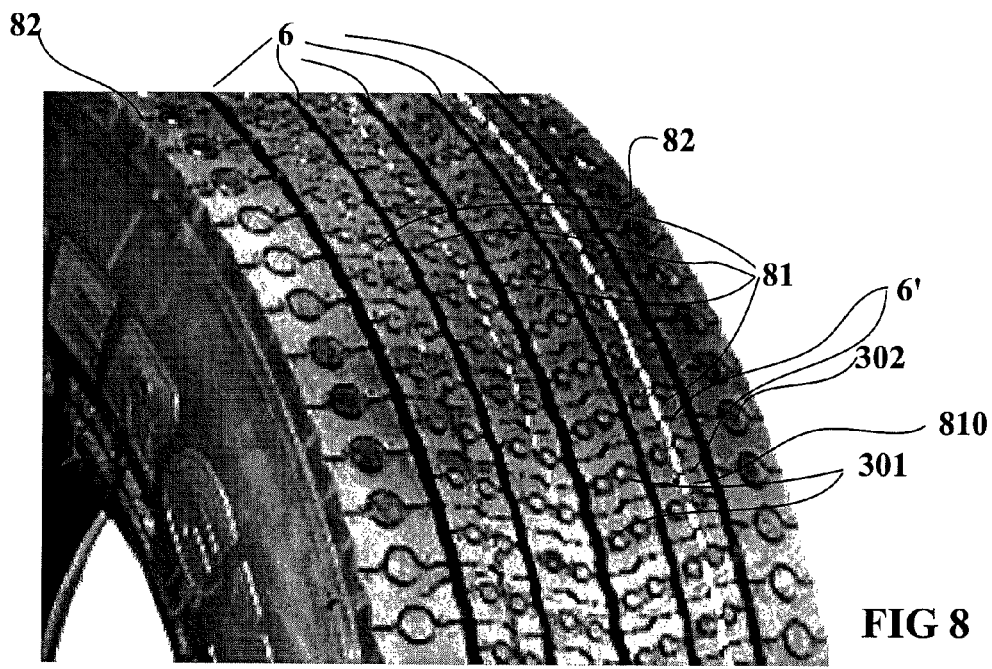
FIG. 8 shows part of a tread of a tire for a heavy goods vehicle comprising a plurality of rubber blocks according to the invention.

FIG. 8 shows part of a tread for a tire for a heavy goods vehicle provided with five grooves 6 running circumferentially and delimiting four intermediate ribs 81. Two edge ribs 82 are formed axially on each side of the intermediate ribs 81. Each intermediate rib 81 comprises a plurality of transverse incisions 6' delimiting parts of ribs 810; formed on each rib part 810 are two blocks 301 of which the molding elements correspond to the element shown in FIG. 7. These two blocks 301 are offset from one another in the circumferential direction.

Moreover, the edge rib 82 comprises a plurality of blocks 302 identical in shape to that of the blocks 301 of the intermediate ribs; these blocks 302 have diameters which are 2.5 times those of the blocks 301 of the intermediate ribs 81.

In this way it is possible to obtain a very long length of edges that come into contact with the roadway while at the same time limiting the loss of rigidity and improving the mechanical operation of the rubber blocks in their contact with the roadway.

The invention is not restricted to the examples described and depicted and various modifications may be made thereto without departing from its scope. For example, and even though all the examples given show rubber blocks of which the contact surface in the as-new state is at the same level as the running surface of the tread, it is easy to apply the same teaching to a rubber block the contact surface of which is offset from the surface of the tread (which means that this contact surface may be recessed or raised relative to the running surface).

The invention claimed is:

1. A tread for a tire, the tread having a thickness and provided with a running surface intended to come into contact with the roadway when running, this tread comprising a plurality of rubber blocks, wherein each rubber block comprises a mean axis XX' intersecting the running surface of the tread, a height at least equal to the thickness of the tread, and a side wall, wherein the sidewall:
    makes a full circuit of the block about the axis XX';
    intersects the running surface of the tread at an edge which encloses a geometric outline of the block on the running surface, and which delimits a contact surface via which the block makes contact with the roadway;
    connects, at its base inside the tread, to a wall opposite, such that the side wall of the block and the wall opposite delimit an incision having a mean width;
    has a lateral surface with at least one notch having a depth measured perpendicular to the lateral surface of the sidewall and a width measured parallel to the lateral surface of the sidewall, wherein the at least one notch making a full circuit of the block about the axis XX', that is to say at least over 360 degrees, and is situated a distance from the contact surface of the block that is between 70% and 80% of the height H of the block.

2. A tread for a tire, the tread having a thickness and provided with a running surface intended to come into contact with the roadway when running, this tread comprising a plurality of rubber blocks, wherein each rubber block comprises a mean axis XX' intersecting the running surface of the tread, a height at least equal to the thickness of the tread, and a side wall, wherein the sidewall:
    makes a full circuit of the block about the axis XX';
    intersects the running surface of the tread at an edge which encloses a geometric outline of the block on the running surface, and which delimits a contact surface via which the block makes contact with the roadway;
    connects, at its base inside the tread, to a wall opposite, such that the side wall of the block and the wall opposite delimit an incision having a mean width;
    has a lateral surface with at least one notch having a depth measured perpendicular to the lateral surface of the sidewall and a width measured parallel to the lateral surface of the sidewall, wherein the at least one notch making a full circuit of the block about the axis XX', that is to say at least over 360 degrees, and the at least one notch being positioned between 20% and 80% of the height H of the block wherein the dimensions of each notch are such that their depth into the block and their width are each at least equal to the mean width of the incision delimiting the said block.

3. A tread for a tire, the tread having a thickness and provided with a running surface intended to come into contact with the roadway when running, this tread comprising a plurality of rubber blocks, wherein each rubber block comprises a mean axis XX' intersecting the running surface of the tread, a height at least equal to the thickness of the tread, and a side wall, wherein the sidewall:

makes a full circuit of the block about the axis XX';

intersects the running surface of the tread at an edge which encloses a geometric outline of the block on the running surface, and which delimits a contact surface via which the block makes contact with the roadway;

connects, at its base inside the tread, to a wall opposite, such that the side wall of the block and the wall opposite delimit an incision having a mean width;

has a lateral surface with at least one notch having a depth measured perpendicular to the lateral surface of the sidewall and a width measured parallel to the lateral surface of the sidewall, wherein the at least one notch making a full circuit of the block about the axis XX', that is to say at least over 360 degrees, and the at least one notch being positioned between 20% and 80% of the height H of the block wherein the area of the contact surface of the block as new is less than the cross-sectional area of the base of the block.

4. The tread according to claim 3, wherein the area of the contact surface increases continuously from the surface in the as-new state to the base of the block.

5. A tread for a tire, the tread having a thickness and provided with a running surface intended to come into contact with the roadway when running, this tread comprising a plurality of rubber blocks, wherein each rubber block comprises a mean axis XX' intersecting the running surface of the tread, a height at least equal to the thickness of the tread, and a side wall, wherein the sidewall:

makes a full circuit of the block about the axis XX';

intersects the running surface of the tread at an edge which encloses a geometric outline of the block on the running surface, and which delimits a contact surface via which the block makes contact with the roadway;

connects, at its base inside the tread, to a wall opposite, such that the side wall of the block and the wall opposite delimit an incision having a mean width;

has a lateral surface with at least one notch having a depth measured perpendicular to the lateral surface of the sidewall and a width measured parallel to the lateral surface of the sidewall, wherein the at least one notch making a full circuit of the block about the axis XX', that is to say at least over 360 degrees, and the at least one notch being positioned between 20% and 80% of the height H of the block wherein the block further comprises at least one additional connection with the rest of the tread, this additional connection being afforded by a bridge of rubber connecting the side wall of the block to the wall opposite, this rubber bridge being located very close to the base of the block and limited in height to below the notch closest to the base of the block.

6. The tread according to claim 5, wherein each block comprises four bridges of rubber uniformly distributed about the block.

7. A tread for a tire, the tread having a thickness and provided with a running surface intended to come into contact with the roadway when running, this tread comprising a plurality of rubber blocks, wherein each rubber block comprises a mean axis XX' intersecting the running surface of the tread, a height at least equal to the thickness of the tread, and a side wall, wherein the sidewall:

makes a full circuit of the block about the axis XX';

intersects the running surface of the tread at an edge which encloses a geometric outline of the block on the running surface, and which delimits a contact surface via which the block makes contact with the roadway;

connects, at its base inside the tread, to a wall opposite, such that the side wall of the block and the wall opposite delimit an incision having a mean width;

has a lateral surface with at least one notch having a depth measured perpendicular to the lateral surface of the sidewall and a width measured parallel to the lateral surface of the sidewall, wherein the at least one notch making a full circuit of the block about the axis XX', that is to say at least over 360 degrees, and the at least one notch being positioned between 20% and 80% of the height H of the block, wherein the geometric outline of the edge delimiting the contact surface of the as-new block is an ellipse having a major axis and wherein the contour of the base of the block is also in the shape of an ellipse having a major axis oriented differently from the major axis of the ellipse of the as-new contact surface.

* * * * *